Patented Apr. 20, 1948

2,440,117

UNITED STATES PATENT OFFICE 2,440,117

PROCESS FOR PREPARING SULFONAMIDES

Alexander H. Popkin, Bronx, N. Y., assignor to Sun Chemical Corporation, a corporation of Delaware No Drawing. Application March 11, 1944, Serial No. 526,133

5 Claims. (Cl. 260—556)

This invention relates to processes for preparing organic sulfonamides and particularly the process for preparing organic sulfonamides containing an amino radical.

It is an object of the present invention to provide a method, characterized by simplicity and economy of operation, for preparing organic sulfonamides containing an amino radical.

Another object of the present invention is to provide a method for preparing organic sulfonamides containing a substituted amino radical, by chlorsulfonation of an organic amine and subsequent amination of the sulfonated product.

Other objects of the invention will be apparent from the description and appended claims.

I have found that organic sulfonamides containing a substituted amino radical can be prepared by relatively simple and economical methods, as hereinafter described. Such sulfonamides have an extremely great utility, because of the valuable characteristics in the field of medicinal materials and organic coloring agents, among others. Processes for preparing these materials, according to the present invention, now make these materials more readily available, in that efficient and economical methods are herein described for making these valuable materials—methods which now make readily available such highly useful materials as described.

The present processes herein described are applicable in their utility to a variety of starting materials, included among which are arylamines, diarylamines and amines of condensed cyclic compounds, such as naphthylamine. Several examples are hereinafter given, illustrative of successful operations and of the practicing of the present invention.

*Example 1.*—To a reaction vessel containing 105 grams of chlorsulfonic acid, there is added 32.3 grams of 2-aminobiphenyl, under conditions such that predominantly a monosulfonyl chloride is secured—and with these materials, successful results are secured by keeping the mixture under agitation, as by stirring, throughout the addition and subsequent heating period, by maintaining the temperature between 25° C. and 70° C. throughout the addition period, and by incorporating the aminobiphenyl over the period of fifteen minutes. At the conclusion of this addition the mixture then is heated to 90° C. and maintained at that temperature for 1.5 hours, after which the mixture is cooled to room temperature.

The reaction mixture secured then is incorporated into a reaction vessel containing 300 cc. of concentrated ammonia (26° Bé.), and with these quantities of materials, amination is secured by maintaining the reaction mixture between 0° C. and 30° C., as by refrigeration, and by maintaining the reaction mixture under agitation, as by stirring throughout the addition period. To insure completion of the amination reaction, the admixture is agitated for several hours further, after which the precipitate which has formed is separated from the liquid portion, as by filtration. This solid material then is washed with several portions of water until no traces of chloride or sulfate ion are present in the washings—the tests for these ions being well known chemical tests. After completion of the washing operation, the solid material is dried to remove the remaining water, a satisfactory drying temperature being 80° C. The material thus obtained is 2-aminobiphenyl-4'-sulfonamide.

*Example 2.*—To a reaction vessel containing 420 grams of chlorsulfonic acid are added 129.2 grams of 4-aminobiphenyl under conditions such that predominantly a monosulfonyl chloride is formed—and with these reactants, successful operation is secured by maintaining a temperature between 25° C. and 65° C., by adding the aminobiphenyl over a period of two hours, and by maintaining the admixture under reaction agitation conditions, as by stirring, throughout the addition period. The admixture then is heated to 90° C. and maintained at that temperature for three hours under reaction agitation conditions, to complete the chlorsulfonation reaction, after which the materials are cooled to room temperature.

The resulting product then is added to a reaction vessel containing 1300 cc. of concentrated ammonia (26° Bé.) to effect amination of the sulfonyl chloride—successful operations with these materials being effected by maintaining the reaction admixture at a temperature between 0° C. and 10° C. and by effecting agitation of the mixture throughout the addition period. When addition is completed, the material is agitated for several hours to complete formation of a precipitate, which then is separated from the liquid materials, as by decantation. The solid material thus obtained is washed with several portions of hot water until freed from chloride and sulfate ion, and the washed product then heated to remove the water remaining, satisfactorily at 100° C. The solid material thus obtained is 4-aminobiphenyl-4'-sulfonamide.

*Example 3.*—Into a reaction vessel containing 105 grams of chlorsulfonic acid, there is incorporated 20.6 grams of m-nitroaniline to effect formation of a monosulfonyl chloride—successful results being obtained with the above starting materials by effecting incorporation over a period of twenty minutes, by maintaining the mixture under agitation throughout the addition period, and by maintaining the temperature between 25° C. and 50° C. throughout the addition period. Subsequently the resulting admixture is heated to 90° C. under agitation and maintained at that temperature for a period of two hours, after which the mixture is cooled to room temperature.

The product thus obtained is added to a reaction vessel containing 300 cc. of concentrated ammonia (26° Bé.) to effect amination of the sulfonyl chloride—and with the materials described above, successful results are obtained by maintaining the reaction mixture between 0° C. and 25° C. and by maintaining the mixture under agitation, as by stirring, throughout the addition period. To complete amination, the mixture is agitated for several hours further and the precipitate which forms is then separated from the liquid portion, as by filtration. The precipitate then is washed with water to remove therefrom any chloride and sulfate ion, and subsequently dried at 80° C. to remove the water remaining. In this way there is obtained m-nitroaniline-x-sulfonamide, the symbol $x$ indicating that the position of the sulfonamide group in the compound is not known with certainty at the present time.

*Example 4.*—Alpha-naphthylamine (21.5 grams) is added to 105 grams of chlorsulfonic acid in a reaction vessel, under conditions such that predominantly a monosulfonyl chloride is obtained—successful operations with these materials being effected by agitation, as by stirring, of the mixture throughout the addition period, by maintaining the temperature between 25° C. and 65° C. throughout addition, and by effecting addition over a period of twenty minutes. To insure completion of the reaction, the temperature of the admixture then is raised to 90° C. and maintained at that point for two hours under agitation conditions as described above, after which the mixture is cooled to room temperature.

The product thus obtained is incorporated in a reaction vessel containing 300 cc. of concentrated ammonia (26° Bé.) to effect amination of the sulfonyl chloride—successful results with these materials resulting from maintaining the mixture under agitation throughout the addition, and the temperature between 0° C. and 18° C., as by refrigeration. The mixture then is agitated for several hours further to insure completion of the reaction, and the precipitate which forms is removed from the liquid material, as by filtration. The solid product thus obtained is washed with water to remove chloride and sulfate ions, and then heated at 80° C. to remove any remaining water therefrom. In this way there is obtained alpha-naphthylamine-x-sulfonamide.

From the illustrative examples above set forth, it is seen that by the present invention there is provided a method which is simple and economical for preparing highly valuable sulfonamides, and which is a highly important advance in the preparation of such extremely valuable and important materials. By practicing the present invention it now becomes possible to prepare organic sulfonamides containing an amino radical, without the necessity of employing expensive organic materials to protect the amino group during chlorsulfonation and amination, and by a simple procedure which removes the necessity of much cumbersome and expensive chemical equipment and operations. Also the present invention provides a method whereby it becomes unnecessary to employ raw materials which are used and destroyed in the reaction, and yet which are of no chemical value in the preparation of the compounds, except in that they serve to protect what have hitherto been considered reactive radicals present in the original starting materials.

It is not known with certainty at the present time just why the processes, as herein described, are effective for preparing such materials, nor is it known with complete certainty the entire set of chemical reactions involved. But what is known is that by employing the processes herein described, highly valuable organic materials can be secured by a method which is simple in operation and relatively inexpensive with reference to materials employed.

While the processes for preparing the products described constitute preferred embodiments of the invention, it will be understood that changes may be made therein without departing from the scope of the invention, as defined in the claims.

What is claimed is:

1. A process for preparing a monosulfonamide of a primary organic aromatic amine, which consists in the steps of chlorsulfonation of a primary organic aromatic amine with chlorsulfonic acid by adding said primary organic aromatic amine to said chlorsulfonic acid in the ratio of approximately 1 mol of said primary organic aromatic amine to 8–10 mols of chlorsulfonic acid at a temperature within the range of approximately 25–70° C., and thereafter heating said admixture at 90° C., to secure a monosulfonyl chloride material, thereafter aminating said sulfonyl chloride material with ammonia to furnish an aminated product, and thereafter separating and recovering said aminated product.

2. A process for preparing a monosulfonamide of a primary biarylamine which consists in the steps of chlorsulfonation of a primary biarylamine with chlorsulfonic acid by adding said primary biarylamine to said chlorsulfonic acid in the ratio of approximately 1 mol of said primary biarylamine to 8–10 mols of chlorsulfonic acid at a temperature within a range of approximately 25–70° C., and thereafter heating said admixture at 90° C. to secure a monosulfonyl chloride material, thereafter aminating said sulfonyl chloride material with ammonia to furnish an aminated product, and thereafter separating and recovering said aminated product.

3. A process for preparing a monosulfonamide of a naphthylamine which consists in the steps of chlorsulfonation of a naphthylamine with chlorsulfonic acid by adding said naphthylamine to said chlorsulfonic acid in the ratio of approximately 1 mol of said naphthylamine to 8–10 mols of chlorsulfonic acid at a temperature within the range of approximately 25–70° C., and thereafter heating said admixture at 90° C. to secure a monosulfonyl chloride material, and thereafter aminating said sulfonyl chloride material with ammonia to furnish an aminated product, and thereafter separating and recovering said aminated product.

4. A process for preparing a monosulfonamide of m-nitroaniline, which consists in the steps of chlorsulfonating m-nitroaniline with chlorsulfonic acid by adding said m-nitroaniline to said chlorsulfonic acid in the ratio of approximately 1 mol of m-nitroaniline to 9 mols of chlorsulfonic acid at a temperature within the range of approximately 25-50° C. and thereafter heating said admixture at 90° C., whereby a monosulfonyl chloride material is formed in reaction admixture, thereafter aminating said reaction admixture with ammonia, whereby a monosulfonamide of m-nitroaniline is formed in reaction admixture, and thereafter separating and recovering said monosulfonamide.

5. A process for preparing a monosulfonamide of an aminobiphenyl, which consists in the steps of chlorsulfonating an aminobiphenyl with chlorsulfonic acid by adding said aminobiphenyl to said chlorsulfonic acid in the ratio of approximately 1 mol of aminobiphenyl to 8 mols of chlorsulfonic acid at a temperature within the range of approximately 25-70° C., and thereafter heating said admixture at 90° C., whereby a monosulfonyl chloride material is formed in reaction admixture, thereafter aminating said reaction admixture with ammonia, whereby a monosulfonamide of an aminobiphenyl is formed in reaction admixture, and thereafter separating and recovering said monosulfonamide.

ALEXANDER H. POPKIN.

REFERENCES CITED

The following references are of record in the file of this patent:

UNITED STATES PATENTS

| Number | Name | Date |
|---|---|---|
| 1,911,819 | Schweitzer | May 30, 1933 |

FOREIGN PATENTS

| Number | Country | Date |
|---|---|---|
| 167,377 | Switzerland | May 1, 1934 |

OTHER REFERENCES

Cumming, "Systematic Organic Chemistry," 1926, page 309.

Chemical Abstracts, vol. 22, 1928, pages 231 and 1972.

Organic Syntheses, Collective vol. I (1932), pages 8 and 9.

Sidgewick's Organic Chemistry of Nitrogen (1937), page 157.

Chemical Abstracts, vol. 35 (1941), pages 5458-5459.

Beilstein, Handbuch der Org. Chemie., vol. XIV, page 686.